Figure 1:
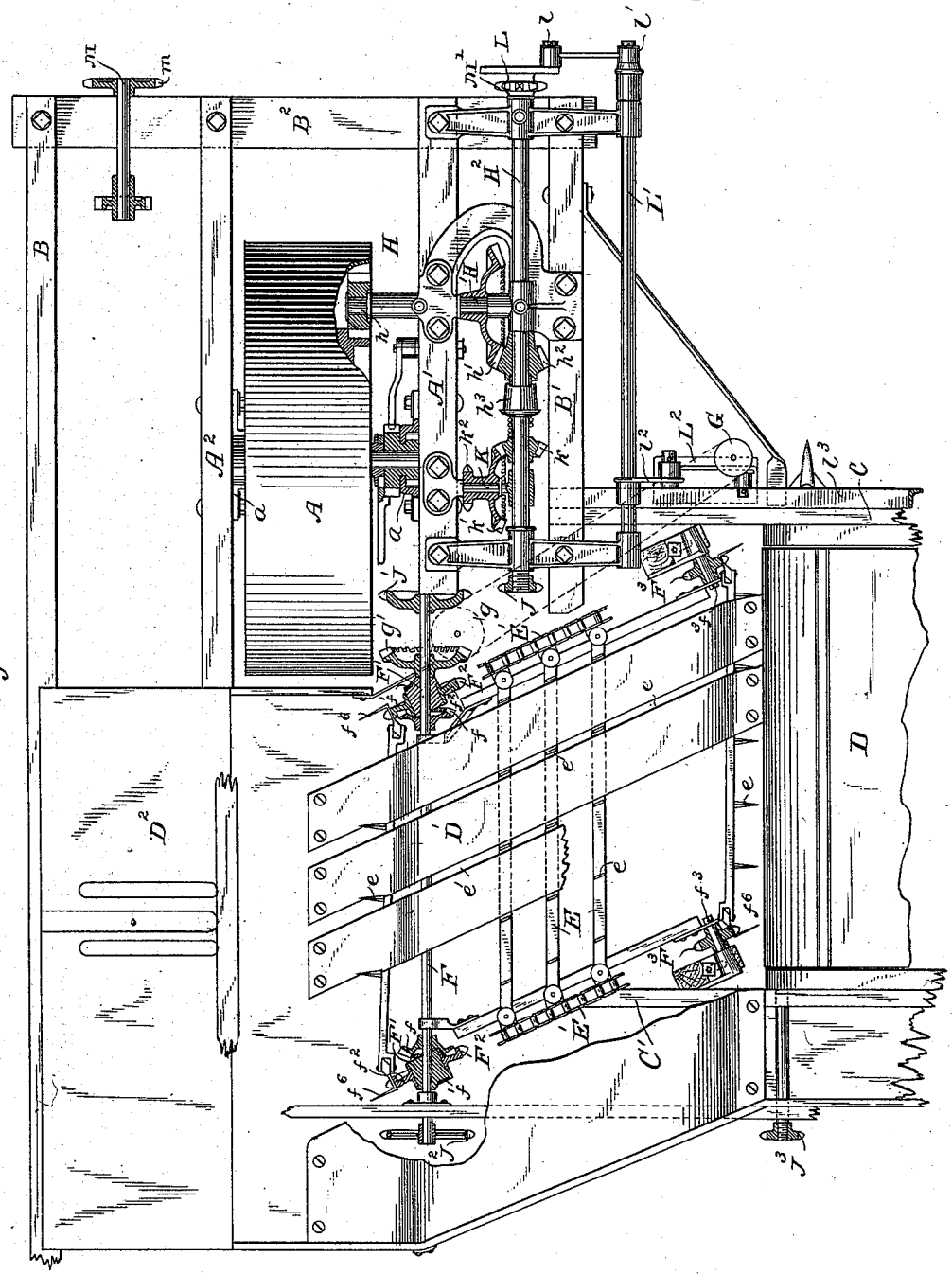

(No Model.)
4 Sheets—Sheet 2.
H. E. PRIDMORE.
HARVESTER BINDER.
No. 401,901. Patented Apr. 23, 1889.
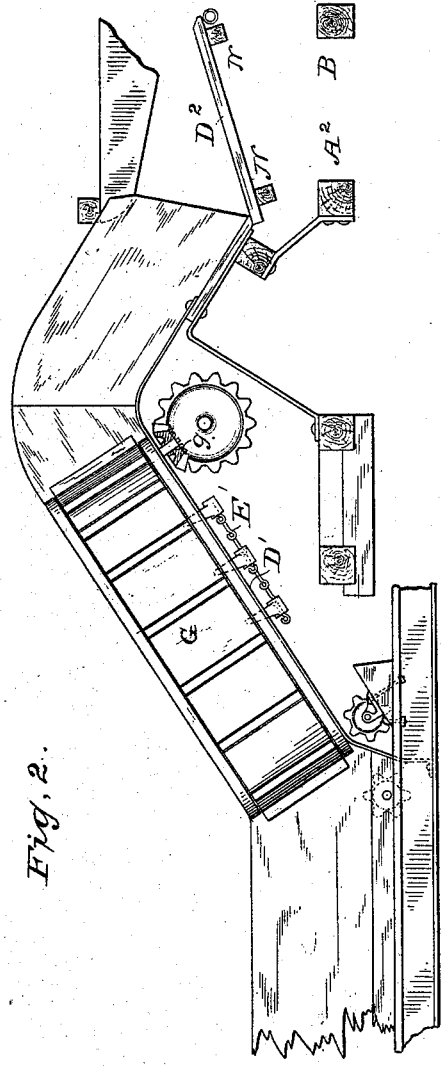
Fig. 2.
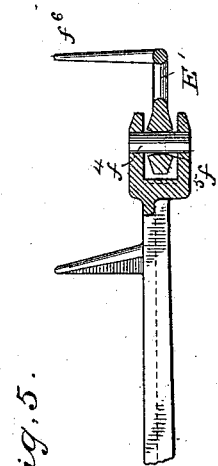
Fig. 5.
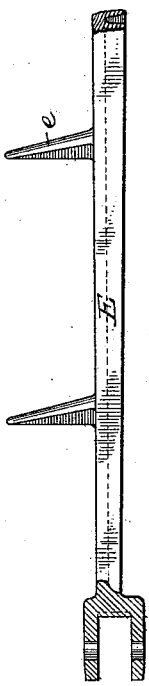
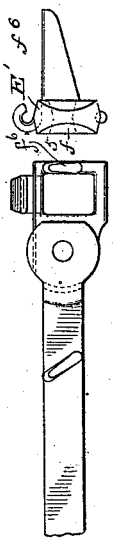
Fig. 6.
WITNESSES.
Wm A. Skinkle
Henry A. Lamb
INVENTOR.
Henry E. Pridmore.
By his Attorneys (No Model.)  H. E. PRIDMORE.  4 Sheets—Sheet 3.
HARVESTER BINDER.
No. 401,901. Patented Apr. 23, 1889.
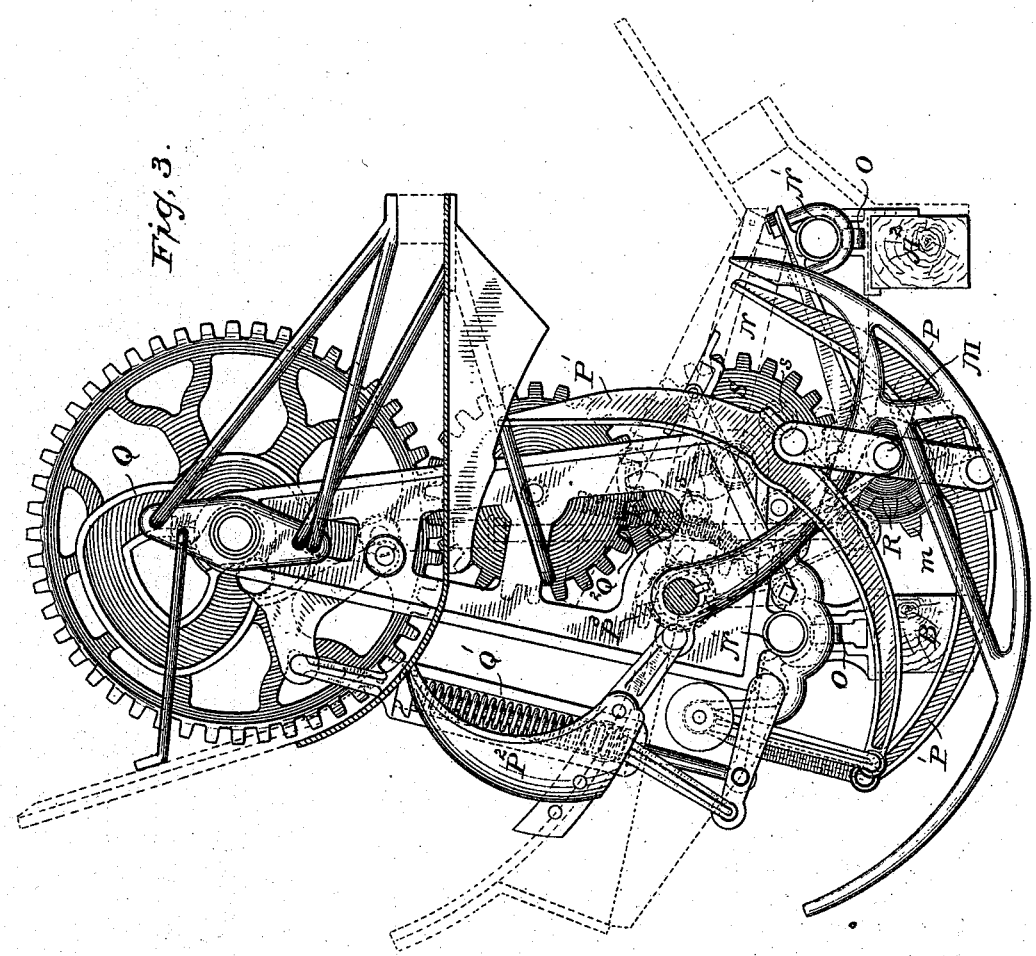
WITNESSES,
Wm A. Skinkle
Henry A. Lamb
INVENTOR,
Henry E. Pridmore.
By his Attorneys
Parkinson & Parkinson (No Model.) 4 Sheets—Sheet 4.
H. E. PRIDMORE.
HARVESTER BINDER.
No. 401,901. Patented Apr. 23, 1889.
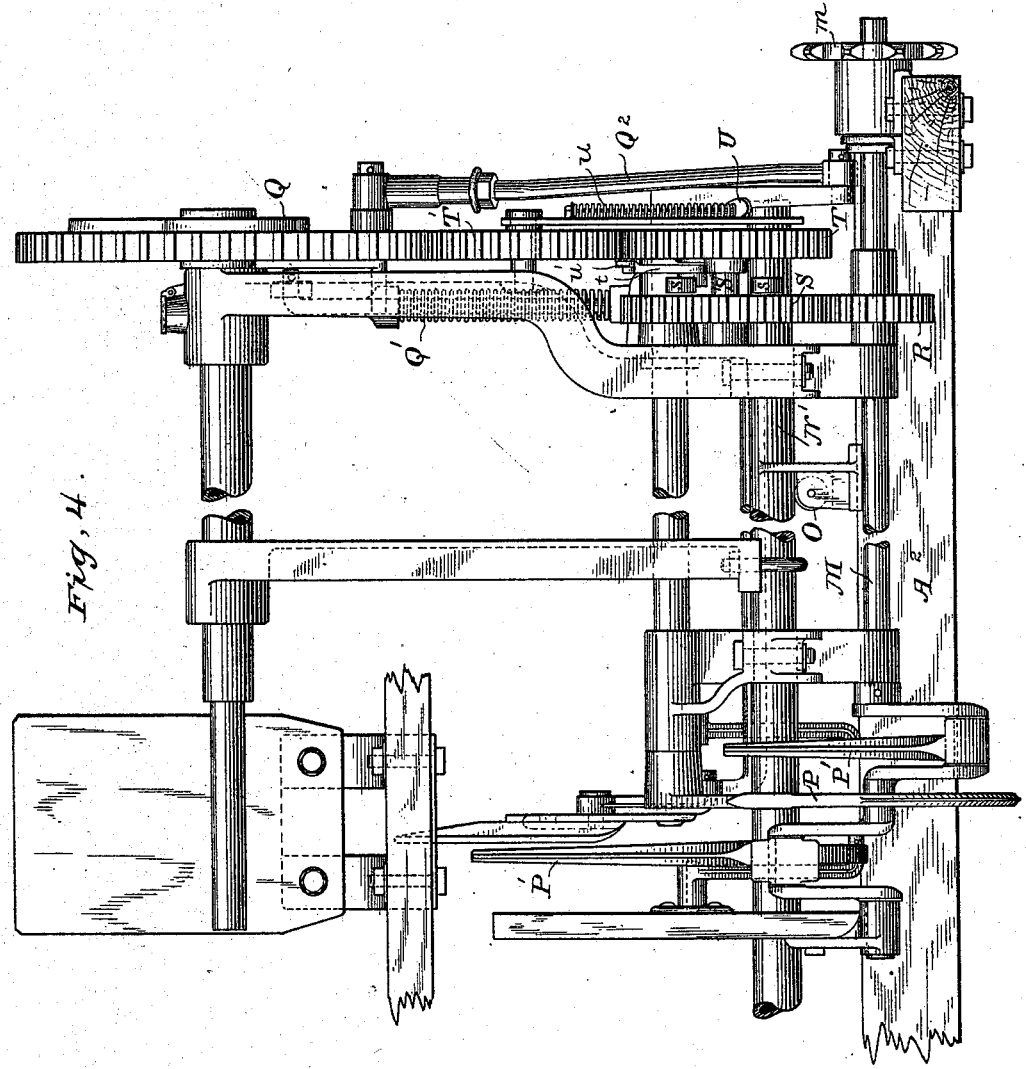
WITNESSES.
Wm A. Skinkle
Henry A. Lamb
INVENTOR.
Henry E. Pridmore.
By his Attorneys
Parkinson & Parkinson

UNITED STATES PATENT OFFICE.

HENRY E. PRIDMORE, OF CHICAGO, ILLINOIS, ASSIGNOR TO THE McCORMICK HARVESTING MACHINE COMPANY, OF SAME PLACE.

HARVESTER-BINDER.

SPECIFICATION forming part of Letters Patent No. 401,901, dated April 23, 1889.

Application filed June 6, 1885. Serial No. 167,908. (No model.)

*To all whom it may concern:*

Be it known that I, HENRY E. PRIDMORE, of Chicago, in the county of Cook and State of Illinois, have invented certain new and useful Improvements in Harvester-Binders, of which the following is a specification.

My invention relates to that class of harvester-binders which have now become generally styled "low-down machines"—that is, which have a low elevator, dispensing with the A-frame over the main wheel; and it pertains chiefly to the general structure and organization of such machines, whereby the binding apparatus is brought nearer to the ground and the machine is better balanced, and to certain details for the more perfect carrying of the grain up the elevator, and to prevent the interference of the tripping-clutch with the binder-gearing by picking up the grain from the stubble and sweeping it into such gearing.

These improvements may be briefly summarized in the following statement: The elevator sheers obliquely backward from the platform to bring its head immediately to the rear of the main wheel, that it may deliver to a binding-table and automatic binding mechanism outside of the line of said wheel. The larger part of the gearing and the greatest weight thereof are on the grain side of the main wheel and in front of a line drawn from the axle of said wheel to the axle of the grain-wheel, so as to balance the weight of this oblique elevator and of the platform behind such line. The grain is carried up the elevator by teeth set upon parallel bars universally jointed to the links of chains which are borne upon and actuated by sprocket-wheels set askew parallel with the length or diagonal trend of the elevator, so that the tooth-bar or rake-bar is in a practically horizontal position at all times. A butter-apron, which may be adjustable if desired, is placed along the front side of the elevator, running upon a lower roller inside of and in close proximity to the inner shoe or divider and upon an upper one near the head of the elevator; and since the usual tripping-clutch, if brought as near the ground as the organization of this machine would require, would have a tendency to pick up straw from the stubble and throw it into the gearing the location of this clutch is changed and certain modifications introduced to adapt it to its new position.

In the drawings, Figure 1 is a top plan view of a machine embodying my invention, some of the parts being shown in section and the ordinary binding mechanism removed to more clearly expose the construction. Fig. 2 is an elevation, from the front, of the low-down elevator and butter-apron and binding-table, with the main frame in section. Fig. 3 is a cross-section of the ordinary binding mechanism looking from the rear of the machine. Fig. 4 is an elevation of said binding mechanism from the inner or grain side, and Figs. 5 and 6 are details of the raking mechanism for the elevator.

A is the main wheel, supported, as usual, in segment rack-standards $a$, bolted to rearwardly-extending timbers A' A² and adjustable up and down along said standards. Parallel with these timbers which form the lateral bars of the wheel-frame, and on the outer side of each, respectively, are other timbers, B B', also extending rearwardly beyond the periphery of the wheel, all four being united in front of the wheel by a cross piece or beam, B², which serves as a support for some of the gearing, as will presently appear. The front sill, C, of the platform-frame is bolted to the two timbers on the inner or grain side of the main wheel, and the rear sill, C', is extended and bolted to each of the four timbers. The two timbers on the stubble side of the main wheel extend beneath the binding attachment and form the supports upon which that is adjusted back and forth to compensate for varying lengths of grain. The main frame as thus constructed brings the finger-bar about abreast of the axle of the main wheel, although it may be carried farther to the front or rear, as may seem desirable, according to the location at which the platform-sills are bolted to the lateral or fore-and-aft timbers of the wheel-frame.

From the platform D rises a low elevator, D', which sheers rearwardly at such inclination as to bring its head immediately behind the tread of the main wheel, where it delivers to a grain-chute, conducting the straw to a binding-table, D², on the outer and rear side of said wheel, which table is advisably parallel with the fore-and-aft line of the platform, as well as of the main wheel, to avoid placing the actuating-shafts of the co-operating binding apparatus at an angle and for the better discharge of the bound sheaf. It is intended to carry the grain up the elevator by means of a rake composed of bars E, having teeth $e$ projecting through slots $e'$ in the decking as they travel up, and which bars are carried by chains E' at the front and rear of the elevator-frame. It is necessary that these bars should always be kept horizontal and parallel with each other, as if the elevator were in line with the platform instead of being oblique thereto. In order to accomplish this the sprocket-wheels over which the chains are thrown must be placed parallel with the length of the elevator, which will bring their axes at a right angle thereto—that is, at an inclination and out of line with each other—so that they cannot be rigidly affixed to a single through-shaft, as in the ordinary construction, and they must be driven simultaneously and co-ordinately. To reach these ends, I mount in boxes upon the head of the elevator a horizontal through-shaft, F, parallel with the platform-rollers, and provided at the front and rear of said elevator with beveled pinions $f$, and just outside of these pinions I place blocks or brasses F', in which said shaft turns freely and which are rigidly secured to the frame-work by straps $f'$, of metal. The peripheries of these brasses are formed to afford bearings oblique to the shaft, but at right angles to the length of the elevator, and upon such bearings are mounted the upper sprocket-wheels, F², which have face-gears $f^2$, meshing with the beveled pinions on the shaft, so that the wheels will be driven by said pinions as the shaft revolves. At the foot of the elevator are other sprocket-wheels, F³, mounted independently of each other in adjustable bearings $f^3$, and with their axes, of course, also at right angles to the length of the elevator, but oblique to its foot. The movement of the chains over the sprocket-wheels will tend to twist the rake-bars, so that if they were rigidly attached to the chain-links either the bars or the links would be broken. To guard against this and to secure the perfect flexibility necessary to keep said bars parallel as they are carried up the elevator and over the sprocket-wheels at the head and foot, they are secured to their respective links by means of pivot-pins $f^4$, passing through a centrally-choked bore, $f^5$, in a lug or offset from such link, so that the bars may have a practically universal movement in relation thereto. Each link to which a tooth or rake bar is attached has also, preferably, a tooth, $f^6$, on its outer side, farthest from the joint with the bar and as near as possible in line with the teeth on said bar.

In front of the elevator is placed a butter-apron, G, the upper end of which is adjacent to the shaft which actuates the elevator-rake, and is supported in such position by brackets from the frame. A beveled pinion, $g$, mounted on the gudgeon of the apron-roller at this end, meshes with a bevel-wheel, $g'$, keyed to said shaft, and the apron is driven thereby. The lower end of this apron is supported by a roller inside of and in close proximity to the inner shoe or divider and slightly in advance of the cutters, and it may be swung toward and from said cutters if found necessary.

In some types of harvesters—as, for instance, the Marsh harvester—the grain-wheel can be mounted in axial line with the main wheel and the mechanism distributed equally on both sides of a line joining the two axles and bisecting the machine lengthwise; but where the platform, as in the present instance, is thrown somewhat behind the breast or front of the main wheel, the grain-wheel, which should be about the center of the divider end of the platform, will be out of line with the axle of the main wheel, and whenever the machine tilts or oscillates it will do so upon a direct line connecting the two axles. With the oblique elevator and the binding mechanism in rear of the main axle, and also necessarily in rear of this axis of oscillation, it is desirable to place as much of the gearing in front of said axis as possible to assist that portion of the platform also lying in front thereof in balancing the heavy parts to the rear. This cannot well be done if the gearing is placed outside of the main wheel, because the axis of oscillation produced constantly approaches and finally intersects a line parallel with the front tread of said wheel, which would throw gearing at the outside too far in advance for economy of space and to be effectively operated from said wheel. I therefore prefer to locate this gearing inside of the main wheel, and, as to the primary or driving parts, all in advance of this axis of oscillation, although some may be in a line with or slightly to the rear of the main axle, but still in front of said axis, as will appear from the drawings and the description immediately ensuing.

The main wheel carries a gear, H, which meshes with and drives the prime pinion $h$, ratchet-clutched to a short shaft, H', supported in bearings bolted to the inner fore-and-aft beams of the main frame in advance of the axle. This shaft has a beveled gear, $h'$, which engages with and drives a beveled pinion, $h^2$, running loosely on a counter-shaft, H², but coupled therewith by a spring-pressed clutch, $h^3$, which will be under the control of the driver. This counter-shaft extends rearwardly to a point behind the front sill of the platform-frame, and there receives a sprocket-wheel, J, in the same vertical plane with a larger sprocket-wheel, J', on the forward end of the shaft at the head of the elevator, and a chain thrown over these two wheels communicates motion from the counter-shaft to the elevator-shaft, and thereby actuates the elevator-rake.

The rear end of the elevator-shaft has another sprocket-wheel, $J^2$, in line with a sprocket-wheel, $J^3$, on the rear end of the shaft of the inner drum or roller of the platform-apron, whereby said apron is driven by the chain connecting these two wheels.

The counter-shaft has nearly opposite to or in line with the main wheel-axle a beveled pinion, $k$, which meshes with and drives a bevel-gear, $k'$, supported on a short axle, K, and having its hub extended and formed with a sprocket-wheel, $k^2$, which is intended to communicate motion to the reel. Said shaft is also extended in advance of the front timber or tie-beam of the main frame and provided with a wrist-wheel, L, or a crank having a wrist-pin, $l$, link-connected with a crank-arm, $l'$, from a rock-shaft, L', running parallel with the fore-and-aft timbers on that side of the main wheel and carried in bearings secured thereto, these bearings being advisably formed in the same castings in which the counter-shaft is journaled. Near its rear end this rock-shaft has another crank-arm, $l^2$, receiving a pitman, $L^2$, which is connected with the cutter-bar $l^3$ and actuates it concurrently with the oscillations of the shaft.

Outside of the main wheel and close to and parallel with the outer lateral bar or sill—that is, parallel with the counter-shaft—is placed the shaft M, for communicating motion to the binder, having at its front end in advance of the tie-beam a sprocket-wheel, $m$, in line with or in the same vertical plane as a similar sprocket-wheel, M', on the end of the counter-shaft just within the disk or wrist-wheel thereon, so that a chain may be thrown over the two wheels and the binder-driving shaft driven from the counter-shaft.

The binder attachment carrying the already-mentioned grain-receptacle is, in the main, of the usual form employed in the well-known McCormick binder, being composed of a frame, N, partly of wood and partly of metal, with transverse tubular frame-bars N', which are supported from the two outer lateral or fore-and-aft beams of the wheel-frame prolonged to come beneath said attachment. Anti-friction rolls O are interposed between said beams and the tubular bars, which latter are properly clipped or held in contact therewith, so that the binder-frame may be adjusted back and forth along the delivery end of the elevator, and not be removed therefrom unless intentionally.

Other parts, which are old and form no part of my invention, are the binder-arm P, the packers P', link-supported at the heel end and actuated by cranks on the binder-driving shaft, the outside compressor, $P^2$, the table-trip $P^3$, the gear and cam wheel Q and the link Q', and pitman $Q^2$, connecting said wheel with the compressor and binder-arm. These are arranged in such manner, consequent upon the before-mentioned position of the binding-table, that the packing, encircling, tying, and ejecting of the sheaf are conducted in a line parallel with the produced line of the platform-conveyer or at right angles to the line of the main wheel.

Heretofore the gear and cam wheel has been operated by means of a loose pinion and trip-clutch mounted on the end of the driving-shaft, and the two intermediate gear-wheels transmitting motion from the pinion when in engagement with its shaft to said gear and cam wheel, which in its revolution controls the movements of the binder-arm, compressor and trip, and holder and cutter. The clutch was formed by means of a cross-head fast to the driving-shaft and provided with driving-lugs and a dog pivoted to the loose pinion, spring-pressed toward engagement with the lugs, and having a lever-arm which projected beyond the periphery of the pinion in a full-sized machine—say two inches—so as to be intercepted and stopped by the trip-latch and closed against the stress of the spring, whereby the dog would be rocked upon its axis and thrown out of engagement with the driving-lug, but when released by the latch would be returned to engagement by the action of said spring.

The binding attachment having been brought down close to the ground by the construction which I now propose, the projecting arm or lever which, following the old arrangement, would be carried by the driving-shaft, lying nearer to the ground than any other shaft in the attachment, would tend to pick up straw and débris and throw them up into the gearing in every revolution, thus endangering the operation of the machine by clogging or choking. I therefore deem it necessary or advisable to change the location of this clutch, carrying it somewhat higher out of proximity to the stubble, and to do this am obliged to make the following reorganization:

In the first place, the pinion R, heretofore loose on the driving-shaft, is now made fast thereto, so as to constantly drive it, and meshes with a loose pinion, S, on a short counter-shaft, S', which in the former arrangement carried one of the idle pinions in the train of gear between the driving-shaft and gear and cam wheel. This loose pinion has driving-lugs $s$ on its face, and alongside of it upon the same shaft opposite to these lugs is mounted a second gear, T, to which is pivoted a dog, $t$, similar in shape to but reversed in position, however, from the dog formerly used on the driving-shaft, since its wheel revolves in reverse direction. This dog is pressed out by a spring that normally tends to carry it into engagement with one or the other of the driving-lugs, coupling the two gear-wheels together, and causing the one which carries the dog to transmit motion to the gear-wheel T', which directly engages with and drives the gear and cam wheel. The trip-latch U is pivoted, as before, to the binder-arm shaft and pressed down by a spring, $u$, which, when the binder-arm is at rest beneath the decking, holds it in position to engage with the driving-dog and uncouple that from the driving-lugs, but yet permits it to be raised by the action of the trip-lever and tripping rock-shaft; but, instead of being straight, as heretofore, the dog has a hook, $u'$, at its free end on account of the reversed position and movement of the traveling dog, so as to catch over the farther side of the lever-arm therefrom to uncouple it, as it were, by a dragging action instead of direct opposition, such as afforded when it is rotated toward instead of from the latch.

The operation of the machine will be understood from the foregoing description and from its analogy to that of other binders already known to the public, and therefore needs no further explanation.

I claim—

1. The combination, substantially as hereinbefore set forth, of the main wheel, the finger-bar practically abreast the axle on which said main wheel turns, the platform, the diagonal elevator trending rearwardly from the delivery end of the platform, the binding table or receptacle parallel with the plane of the main wheel, and the binding devices operating upon the gavel at right angles to said line.

2. The combination, substantially as hereinbefore set forth, of the elevator-frame trending diagonally to the rear from the end of the platform, the sprocket-wheels arranged at the head and foot of said elevator, the chains connecting said wheels, and the rake-bars universally jointed to links of said chains.

3. The combination, substantially as hereinbefore set forth, of the diagonal elevator-frame, the through-shaft at one end thereof, the bevel-pinions on said shaft, the blocks or brasses encircling the shaft in proximity to said gears and secured to the frame, oblique bearings on said brasses, the sprocket-wheels mounted on said bearings and having face-teeth which mesh with the bevel-pinions, the sprocket-wheels at the opposite end of the elevator-frame turning upon oblique bearings, the chains connecting the sprocket-wheels at the top of the elevator with the corresponding wheels at the foot, and the rake-bars universally jointed to links of said chains.

4. The combination, substantially as hereinbefore set forth, with the main wheel and its axle, the finger-bar practically abreast of said axle, the platform arranged in the rear of the axle, the oblique elevator trending rearwardly, and the binding mechanism outside of the plane of said wheel, of the driving-gearing located on the grain side of the main wheel and in advance of the oblique tilting axis between the axle of the main wheel and the axle of the grain-wheels.

5. The combination, substantially as hereinbefore set forth, of the main wheel, the prime pinion engaging with said main wheel in advance of its axle, the counter-shaft driven by the prime-pinion shaft, the diagonal elevator, the through-shaft at the head of said elevator, the sprocket-wheel at the front end thereof, and the sprocket-wheel at the rear end of the counter-shaft.

6. The combination, substantially as hereinbefore set forth, of the main wheel, the prime pinion engaging with said wheel in advance of the main axle, the counter-shaft driven by the prime-pinion shaft, the sprocket-wheel at the rear end of the counter-shaft, the elevator-shaft and its sprocket-wheel, the wrist-wheel at the front end of the counter-shaft beyond the front tie-beam to communicate motion to the cutter-bar, the sprocket-wheel on the counter-shaft adjacent to said wrist-wheel, the driving-shaft for the binder parallel with said counter-shaft outside of the main wheel, and the sprocket-wheel on said binder-driving shaft, whereby it may be driven from the sprocket-wheel at the front of the counter-shaft.

7. The combination, substantially as hereinbefore set forth, of the main wheel, the prime pinion engaging therewith in advance of the main axle, the counter-shaft driven by the prime-pinion shaft, the sprocket-wheel at the rear end of the counter-shaft, the wrist-wheel and sprocket-wheel at the front end of said counter-shaft, the reel-driving shaft and its sprocket-wheel, and the bevel-gears connecting said shaft to the counter-shaft.

8. The combination, substantially as hereinbefore set forth, of the main wheel, the prime pinion engaging therewith in advance of the main axle, the counter-shaft driven by the prime-pinion shaft, the sprocket-wheel at the rear of the counter-shaft, the diagonal elevator, the through-shaft at the head of said elevator, sprocket-wheels at front and rear of said through-shaft, the platform-apron, and a sprocket-wheel at the rear end of the gudgeon of the inner roller of said platform-apron, whereby motion may be communicated by chains from the counter-shaft to the elevator-shaft and from the elevator-shaft to the platform-apron.

9. In a grain-binder in which the gear and cam wheel is operated from the constantly-driven packer-shaft by means of two intermediate idle-gears, the combination, substantially as hereinbefore described, with the first idle-gear, of a driver alongside thereof, a tripping-clutch engaging the driver with the idle-gear, and a trip-latch whereby said clutch is disengaged from the idle-gear.

10. The combination, substantially as hereinbefore set forth, of a pinion fixed to the end of the constantly-driven packer-shaft, the loose pinion engaging therewith and having driving-lugs on its face, the second loose pinion alongside the other on the same axle and having a driving-dog to engage with said lugs, and the hooked trip-latch.

HENRY E. PRIDMORE.

Witnesses:
WILLIAM R. BAKER,
PAUL ARNOLD.